United States Patent [19]

Magori

[11] Patent Number: 4,650,958
[45] Date of Patent: Mar. 17, 1987

[54] MONITORING SENSOR FOR THE PRODUCTION OF WELDS

[75] Inventor: Valentin Magori, Munich, Fed. Rep. of Germany

[73] Assignee: Siemens Aktiengesellschaft, Berlin and Munich, Fed. Rep. of Germany

[21] Appl. No.: 781,420

[22] Filed: Sep. 30, 1985

[30] Foreign Application Priority Data

Sep. 28, 1984 [DE] Fed. Rep. of Germany ....... 3435829

[51] Int. Cl.$^4$ .................................................. B23K 9/12
[52] U.S. Cl. ............................. 219/124.34; 219/130.01
[58] Field of Search ........................ 219/124.34, 130.01

[56] References Cited

U.S. PATENT DOCUMENTS

| 3,679,865 | 7/1972 | Jesnitzer et al. | 219/130.01 |
| 4,326,155 | 4/1982 | Griebeler | 219/124.34 |
| 4,419,562 | 12/1983 | Jon et al. | 219/130.01 |

FOREIGN PATENT DOCUMENTS

WO81/01676  6/1981  PCT Int'l Appl.
692704 10/1979 U.S.S.R. ......................... 219/124.34

OTHER PUBLICATIONS

J. P. Foith, "Sensoren fur das Vollmechanische Lichtbogenschweiben–Sensor Systeme", *Schweissen & Schneiden,* 3/1980, pp. 89–93.

Primary Examiner—Clifford C. Shaw
Attorney, Agent, or Firm—Hill, Van Santen, Steadman & Simpson

[57] ABSTRACT

The reception signals of sensor microphones employed in arc welding which pick up ultrasound radiation emanating from the welding arc 5 are checked for their cross-correlation with one another and the follow-up quantity is identified from the value of the cross-correlation. Apart from the microphones to be applied, this requires no modification and/or special design of the actual arc welding apparatus.

8 Claims, 3 Drawing Figures

EVALUATION CIRCUIT 4,650,958

MONITORING SENSOR FOR THE PRODUCTION OF WELDS

BACKGROUND OF THE INVENTION

1. Field of the Invention

The present invention relates to a sensor and more particularly to a sensor used in ultrasonically monitoring the production of welds.

2. Description of the Prior Art

Automatically operating welding apparatus are being employed to an increasing degree, for example in combination with welding robots. It must be guaranteed in such apparatus that, with the assistance of an automatic regulation, the welding electrode is conducted precisely along that path where the weld or weld seam is to be produced or where the parts to be welded to one another abut.

Up to now, the above problem was resolved in that the chronological curve of the electrical welding current flowing during the welding process was monitored. For that purpose, the welding electrode had an oscillating motion impressed on it transversely to the course of the weld or weld seam.

It is known from ZIS-Mitteilungen 7/73 and from "Schweissen und Schneiden" (1980), Pages 89 through 93 for the purpose of positioning the welding electrode to couple ultrasound into the workpieces to be welded to one another, i.e. at both sides of the welding groove, and to acquire a control quantity for the follow-up of the welding electrode from the registered transit times.

In accord with U.S. Pat. No. 4,419,562, the quality of the weld produced is checked by the evaluation of ultrasound arising during the welding process. It has been found, namely, that the ultrasound amplitude is a measure for the quality of the weld. A single receiver microphone is required for the implementation of this method. Insofar as the employment of a plurality of microphones is mentioned in this patent, it is a matter of monitoring a particular surface region with a specific individual microphone of this plurality of microphones, so that continuous coverage of adjacent surface regions of the overall surface is provided on the basis of the plurality of microphones.

The published patent application to the International Patent Application WO No. 81/01 676 likewise discloses an evaluation of ultrasound to be received during welding. Follow-up of the welding electrode is the goal with this received ultrasound. The sound of the ultrasound emanating from the arc is thereby evaluated. In order to obtain different sound of this ultrasound emanating from the arc, the welding current power and/or the momentary topical position of the welding electrode is modulated or swept with respect to the welding groove or weld. This means that the welding device is specially executed for this one and/or other measure or that an existing device must be appropriately remodeled.

SUMMARY OF THE INVENTION

An object of the present invention is to specify a simpler method for monitoring the management of the weld. In particular, the method to be found should be designed such that it can be adapted to any automatically working welding apparatus.

In the invention, the acoustic noise generated by or in the arc, namely its high-frequency air-borne sound component is picked up and evaluated with a plurality of microphones. However, the evaluation ensues based on a principle which differs in comparison to the prior art which does not require modulation of the welding current and/or a prescribed, oscillating motion of the welding electrode.

The welding arc generates sound waves, namely in the high-frequency range. Such ultrasound emanating from the arc is reflected at the mutually opposite workpiece edges of the workpieces to be welded to one another, these workpiece edges having not been welded to one another. Given correct or optimum position of the welding electrode, i.e. given a welding arc occuring at the proper location, these reflections at both edges lead to the fact that the acoustic signals reflected at both edges are at least similar to one another in the fashion of a coherency without chronological offset. The ultrasound of the welding process reflected by each workpiece edge is picked up with at least one microphone from at least two different directions. The cross-correlation function of the electric signals of, for example, two microphones $m_1$ and $m_2$ $$k_{1,2}(\tau) = \frac{1}{\Delta T} \int_0^{\Delta T} m_1(t) \cdot m_2(t - \tau) dt \qquad (I)$$

has its maximum at the value $\tau=0$. In this equation, $\Delta T$ is the integration time interval for the variable "time" $t$ and $\tau$ therein is the chronological offset. A topical offset of the welding electrode relative to the workpiece edges or, respectively, to the rated position of the weld would be expressed in an analogous, chronological offset $\tau$ of the reception signals of the microphones $m_1$ and $m_2$ because the reflected signals are similar to one another due to their common origin in the arc. The sensitivity of the apparatus or of the measure of the present invention can be enhanced in that reception or, respectively, evaluation of sound components proceeding directly from the welding flame to the respective microphone is avoided. This can be undertaken by means of acousto-optical measures and/or by means of electrical compensation in the electronic evaluation of the reception signals.

Noises indirectly generated by the arc which are to be made exploitable are based on the fact that dirt particles suddenly evaporating in the heat of the arc emit characteristic sound waves which are striking or district in terms of their chronological curve. Such particles predominately occur in the region of the edges to be welded to one another.

The attached Figures serve the purpose of further explanation of the invention.

DESCRIPTION OF THE PREFERRED EMBODIMENTS

Figure 1:
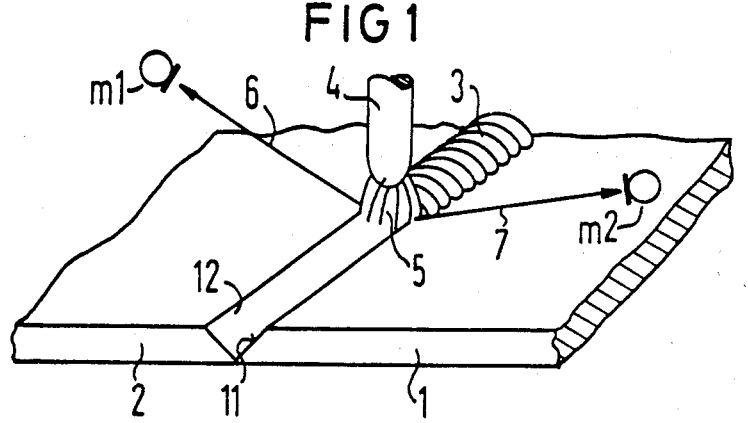
FIG. 1 shows a schematic perspective view of a welding device incorporating the principles of the preset invention.

In FIG. 1 there are shown the two workpieces 1, 2 to be welded to one another with their edges 11 and 12 abutting one another. As is standard for welding per se, these edges 11 and 12 form a V-shaped groove. A weld already made is referenced 3, an electrode is referenced 4 and an occurring welding arc is referenced 5. Ultrasound radiation which is emitted or reflected from the edge 11 to a microphone $m_1$ is indicated by arrow 6 and from the edge 12 to a microphone $m_2$ is indicated by arrow 7. An identical, equidistant path from the weld 3 or from the welding groove between the workpieces 1 and 2 to the respective microphone $m_1$ or $m_2$ is preferably provided.

The microphones $m_1$ and $m_2$ are preferably rigidly positioned in position relative to the welding electrode 4. In particular, the microphones are arranged equidistant from the tip of the welding electrode 4, so that sound emanating from the welding arc has an identical transit time to both microphones $m_1$ and $m_2$. Given exact positions of the tip of the welding electrode 4 or exact position of the welding arc 5 relative to the welding groove, thus, equidistance of the microphones $m_1$ and $m_2$ thus also exists relative to the edges of the welding groove.

Figure 2:
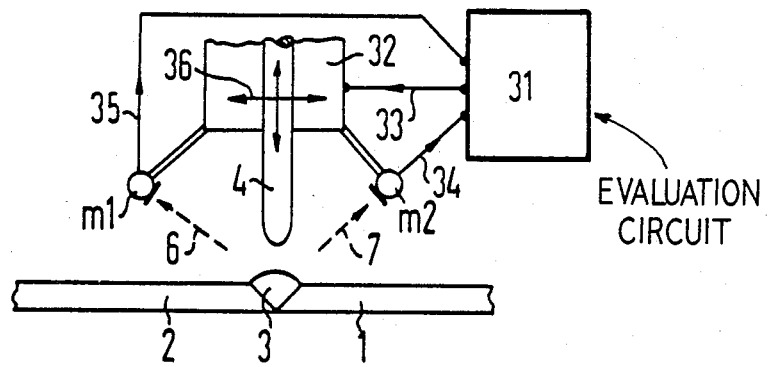
FIG. 2 shows a schematic end view of the device of FIG. 1.

FIG. 2 shows a schematic diagram of an apparatus evaluating the invention. An evaluation circuit is referenced 31, signals 34, 35 of both microphones $m_1$ and $m_2$ being supplied thereto for evaluation. An apparatus 32 is provided in which a mechanism for transversal motion 36 of the welding electrode, i.e. at right angles relative to the longitudinal alignment of the weld, is to be executed in addition to the usual mechanical devices for altitudinal and longitudinal movement of the welding electrode 4. This transversal motion means 32 is controlled such by a correction signal 33 supplied by the evaluation that the welding electrode 4—relative to the transversal direction—is always located in the desired position over the groove formed by the edges 11 and 12, in which groove the workpieces 1 and 2 are to be welded to one another.

Figure 3:
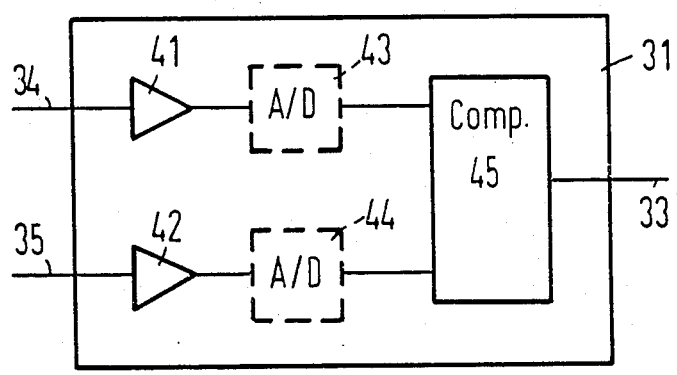
FIG. 3 shows a schematic illustration of a portion of the evaluation circuit.

As shown in FIG. 3, computer 45 is provided in the evaluation circuit 31 in addition to the standard input amplifiers 41 and 42 and analog-to-digital converters 43 and 44 which preferably are to be employed. With this microcomputer 45, the values of the correlation quantity $k_{1,2}(\tau)$ to be respectively obtained in time intervals, namely from the received signals of the microphones $m_1$ and $m_2$, are identified according to the above equation (I). These identified values are evaluated for the follow-up of the welding electrode. The output signal which is the measure of the respective momentary, possibly occurring misorientation of the tip of the welding electrode is obtained at the output 33 of the evaluation circuit 31. Given an exact position of the tip of the welding electrode 4 relative to the welding groove between the workpieces 1 and 2, the correlation value $k_{1,2}$ is a maximum at $\tau=0$, namely when no chronological offset is present in the two signals received from the microphones $m_1$ and $m_2$. Insofar as the microphones $m_1$ and $m_2$ should not be arranged equidistant from the tip of the welding electrode 4, the superimposed but constant difference in transit time resulting from this non-equidistance is to be taken into consideration as a prescribed value $\tau_0$, as is the practice in similarly constituted cases.

As is apparent from the foregoing specification, the invention is susceptible of being embodied with various alterations and modifications which may differ particularly from those that have been described in the preceeding specification and description. It should be understood that I wish to embody within the scope of the patent warranted hereon all such modifications as reasonably and properly come within the scope of my contribution to the art.

I claim as my invention:

1. A weld sensor providing lateral position correcton of the welding electrode, which generates a welding arc to weld along the edges of workpiece being joined, comprising:

a plurality of microphones:

said microphones, with reference to a weld to be produced, being arranged in opposite transverse directions for the reception of ultrasound radiation which is directly or indirectly generated by the arc, reflected at the workpiece edges, and/or proceeding from evaporating particles in the region of the arc and workpiece edges;

an evaluation circuit to which separately received signals are supplied from said microphones and from which a control signal for the lateral position correcting of the welding electrode is continuously generated; and whereby a value of a cross-correlation function of said signals is identified in the evaluation circuit and is evaluated as a position correction quantity.

2. A weld sensor according to claim 1, wherein said microphones are symmetrically situated relative to the weld to be produced.

3. A weld sensor according to claim 1, wherein two microphones are utilized, one on each lateral side of side welding electrode.

4. A method for the chronological correcting of the lateral position of a welding electrode upon employment of ultrasound radiation emanating from the region of the welding arc and the workpiece edges from the evaporating particles, generated directly or indirectly by the welding arc and/or reflected at the workpiece edges comprising the steps of using a plurality of microphones, positioning said microphones in differing transverse directions relative to the welding arc, identifying a value of a cross-correlation function from signals of the plurality of microphones in an evaluation circuit, and evaluating the value of the cross-correlation function as a position correction quantity.

5. A method according to claim 4, wherein the microphones are positioned symmetrically relative to the weld to be produced, so that identical transit time for the ultrasound radiation generated by the welding arc to the microphones exists given an exact position of the tip of the welding electrode.

6. A weld sensor for sensing the lateral position of a welding electrode which generates a welding arc comprising:

a plurality of microphones laterally spaced from said welding electrode, at least one of said plurality of microphones being positioned on each lateral side of said electrode to receive ultrasound radiation, directly or indirectly by reflection, generated by the welding electrode arc, and to generate signals in response to received ultrasound radiation;

an evaluation circuit for separately receiving said microphone generated signals and cross-correlating said signals relative to the known spacing of said microphones to said electrode;

said evaluation circuit including means for generating a control signal continuously for controlling lateral repositioning of said welding electrode.

7. A weld sensor according to claim 6, wherein said microphones are symmetrically situated relative to the weld to be produced.

8. A weld sensor according to claim 6, wherein two microphones are utilized, one on each lateral side of said welding electrode.

* * * * *